(12) United States Patent
Takezoe et al.

(10) Patent No.: US 11,999,088 B2
(45) Date of Patent: Jun. 4, 2024

(54) INSERT SINTERED PART AND MANUFACTURING METHOD FOR SAME

(71) Applicant: DIAMET CORPORATION, Niigata (JP)

(72) Inventors: Shinichi Takezoe, Niigata (JP); Tsuneo Maruyama, Niigata (JP); Hideo Sakai, Niigata (JP)

(73) Assignee: DIAMET CORPORATION, Niigata (JP)

( * ) Notice: Subject to any disclaimer, the term of this patent is extended or adjusted under 35 U.S.C. 154(b) by 0 days.

(21) Appl. No.: 17/788,497

(22) PCT Filed: Jan. 25, 2021

(86) PCT No.: PCT/JP2021/002402
§ 371 (c)(1),
(2) Date: Jun. 23, 2022

(87) PCT Pub. No.: WO2021/153488
PCT Pub. Date: Aug. 5, 2021

(65) Prior Publication Data
US 2023/0033850 A1      Feb. 2, 2023

(30) Foreign Application Priority Data

Jan. 31, 2020 (JP) ................. 2020-014473

(51) Int. Cl.
*B29C 45/14* (2006.01)
*B22F 5/10* (2006.01)
(Continued)

(52) U.S. Cl.
CPC ............ *B29C 45/1459* (2013.01); *B22F 5/10* (2013.01); *B22F 7/08* (2013.01);
(Continued)

(58) Field of Classification Search
CPC .......... B29C 45/1459; B29C 45/14065; B29C 45/26; B29C 45/2616; B29C 45/14778;
(Continued)

(56) References Cited

U.S. PATENT DOCUMENTS

| 2010/0226601 A1 | 9/2010 | Inazuka et al. |
| 2015/0377300 A1 | 12/2015 | Sato et al. |
| 2022/0001446 A1 | 1/2022 | Maruyama et al. |

FOREIGN PATENT DOCUMENTS

| CN | 103522489 A | 1/2014 |
| JP | 09193192 A | 7/1997 |

(Continued)

OTHER PUBLICATIONS

JP-2013194777-A Translation (Year: 2013).*

*Primary Examiner* — Brian D Walck
*Assistant Examiner* — Danielle M. Carda
(74) *Attorney, Agent, or Firm* — Leason Ellis LLP; Melvin C. Garner; Mitsuhiro Haraguchi

(57) ABSTRACT

By using a forming die having a fixed die and a movable die moving along a parting surface on the fixed die and by moving the movable die along the parting surface, to press and hold a sintered part between the movable die and the fixed die, to form a cavity around the sintered part except parts which abut on the fixed die and the movable die by the forming die, and to fill the cavity with melted material which becomes an exterior part, so that the sintered part and the exterior part are integrated by insert molding.

6 Claims, 8 Drawing Sheets

(51) Int. Cl.
*B22F 7/08* (2006.01)
*B29C 45/26* (2006.01)
*B29K 705/00* (2006.01)
*B29L 31/04* (2006.01)
*F16C 33/14* (2006.01)

(52) U.S. Cl.
CPC ........ *B29C 45/14065* (2013.01); *B29C 45/26* (2013.01); *B29C 45/2616* (2013.01); *F16C 33/145* (2013.01); *B29K 2705/00* (2013.01); *B29L 2031/04* (2013.01)

(58) Field of Classification Search
CPC ...... B22F 5/10; B22F 7/08; B22F 7/06; F16C 33/145; F16C 33/128; F16C 2204/20; F16C 2208/00; F16C 2220/04; F16C 2226/80; F16C 2326/01; B29K 2705/00; B29L 2031/04

USPC ............................................................ 419/8
See application file for complete search history.

(56) References Cited

FOREIGN PATENT DOCUMENTS

| | | | |
|---|---|---|---|
| JP | 2003149948 A | | 5/2003 |
| JP | 2003159720 A | | 6/2003 |
| JP | 2003193113 A | | 7/2003 |
| JP | 2007315487 A | | 12/2007 |
| JP | 2008130208 A | | 6/2008 |
| JP | 2013194777 A | * | 9/2013 |
| JP | 2015010249 A | | 1/2015 |
| JP | 2015098921 A | | 5/2015 |
| JP | 2016011740 A | | 1/2016 |
| WO | 2020175351 A1 | | 9/2020 |

* cited by examiner

INSERT SINTERED PART AND MANUFACTURING METHOD FOR SAME

CROSS-REFERENCE TO RELATED PATENT APPLICATIONS

This application is a U.S. National Phase application under 35 U.S.C. § 371 of International Patent Application No. PCT/JP2021/002402 filed on Jan. 25, 2021 and claims the benefit of priority to Japanese Patent Application No. 2020-014473, filed on Jan. 31, 2020, the contents of all of which are incorporated herein by reference in their entireties. The International Application was published in Japanese on Aug. 5, 2021 as International Publication No. WO/2021/153488 under PCT Article 21(2).

FIELD OF THE INVENTION

The present invention relates to an insert sintered part in which a sintered part such as a sintered bearing and an exterior part are integrated and a manufacturing method thereof.

BACKGROUND OF THE INVENTION

A sintered bearing can be used for a long time without oiling, so that it is broadly used as a bearing of a rotating shaft of an automobile, a household electric appliance, acoustic equipment and the like, since lubricant which has been beforehand impregnated inside a sintered body exudes out by pumping action by rotation of a shaft and thermal expansion by friction heat lubricates a friction surface.

This sort of sintered bearing is integrated with an exterior part such as a housing by insert-molding and incorporated with a structure such as an automobile. In this case, since a radial load and a thrust load are applied on the sintered bearing, it is necessary to prevent a rotation about the exterior part and dropping off in an axial direction.

For example, Japanese Unexamined Patent Application, First Publication No. 2003-159720 discloses a sintered bearing (a sintered part) in which bottomed grooves extending from both end surfaces along the axial direction along the axial direction are formed at positions that do not coincide with each other in the axial direction. It is described that the rotation stopper and prevention of dropping off in the axial direction by forming a resin part (exterior part) by insert-molding on the outer peripheral part of the sintered bearing integrally, so that the resin is entered into the bottomed grooves.

Japanese Unexamined Patent Application, First Publication No. 2003-193113 discloses a sintered bearing (sintered part) in which groove part extending along an axial direction and an enlarged-diameter part extending in a circumferential direction are formed on an outer peripheral surface thereof and the groove part divides the extension of the enlarged-diameter part in the circumferential direction. By forming a resin part integrally on the outer peripheral part of this sintered bearing by insert-molding, the sintered bearing is prevented from rotating to the resin part since the resin enters the groove part, and the sintered bearing is prevented from dropping off since the enlarged-diameter part is integrated to cut into the resin part.

CITATION LIST

Patent Literature

[Patent Literature 1] Japanese Unexamined Patent Application, First Publication No. 2003-159720
[Patent Literature 2] Japanese Unexamined Patent Application, First Publication No. 2003-193113

Technical Problem

When a sintered part such as this type of sintered bearing or the like is insert-molded, by forming a space (cavity) on the outer peripheral part of the sintered part disposed in a forming die and injecting melted resin (melted material) into the cavity to be filled, the outer peripheral part of the sintered part is covered with the resin part. The cavity is formed around the sintered part where both end surfaces are abutted to the forming die.

However, it is difficult to manufacture the sintered parts having the same dimension without dispersing of height. For example, in a case in which the height of the sintered part is lower than a designed dimension, a gap is made between the end surface of the sintered part and the forming die, so that melted material enters the gap and a film is made on the end surface of the sintered part. Whereas, in a case in which the height of the sintered part is higher than the designed dimension, a gap is made at a parting line since the forming die is pressed by the sintered part, so that the melted material is forced out from the gap to form burrs.

The present invention is achieved in consideration of the above circumstances and has an object to appropriately integrate the sintered part and the exterior part such as a resin part by insert-molding even when the height of the sintered part such as sintered bearings varies.

SUMMARY OF THE INVENTION

Solution to Problem

A method of manufacturing an insert sintered part of the present invention includes a sintered part-forming step of a forming a sintered part having a first end part and a second end part by powder molding; and an insert-molding step of forming an insert sintered part in which an exterior part is integrated to an outer peripheral part of the sintered part, wherein a forming die used in the insert-molding step has a fixed die and a movable die; a parting surface in which the fixed die and the movable die abut is formed along a movement direction of the movable die. In this manufacturing method, the insert-molding step has: a die-clamping step in which the sintered part is held between the fixed die and the movable die, the movable die is moved along the parting surface, and the sintered part is pressed against the fixed die by the movable die, to form a cavity around the sintered part by covering a region of the sintered part with a gap excepting a part where the first end part abutting the fixed part, and a part where the second part abutting the movable die; and a filling step after the die-clamping step filling the cavity with a melted material being formed into the exterior part.

An insert sintered part includes a sintered part having a first end part and a second end part and an exterior part which is formed integrally with an outer peripheral part of the sintered part; and a parting line is provided on a ridge line intersecting an end surface of the exterior part which is positioned at one end part side of at least either one of the first end part and the second end part and an outer peripheral surface of the exterior part.

According to the present invention, since the movable die moves along the parting surface of the forming die, it is possible to push the sintered part against the fixed die by the movable die so that the fixed die and the movable die are reliably abutted to the sintered part even if the height of the sintered part is irregular. Accordingly, the parting surface is prevented from being covered with the material of the exterior part and the burrs are prevented.

Moreover, since the parting line is formed on the ridge line but not on the outer peripheral surface and the end surfaces of the exterior part, the appearance of the insert sintered part can be improved. Furthermore, in a case in which a groove or the protrusion bar is formed on the outer peripheral part of the sintered part, the sintered part and the exterior part are integrated in a state of stopping the rotation by the groove or the protrusion bar of the sintered part.

As one aspect of the method of manufacturing an insert sintered part according to the present invention, it is preferable that in the forming step of the sintered part, an outer-inclined surface on an outer peripheral surface of at least either one of an end part between the first end part and the second end part be formed to be reduced in a diameter toward an end surface of the end part, and a concave part having a first tapered surface which abuts to the outer-inclined surface be formed on at least one of the fixed die and the movable die, and the first tapered surface be made to abut the outer-tapered surface in the die-clamping step.

In this case, the sintered part is preferably a sintered bearing having one penetrated hole which penetrates the first end part and the second end part.

As another aspect of the method of manufacturing an insert sintered part according to the present invention, it is preferable that in the forming step of the sintered part, an outer-inclined surface on an outer peripheral surface of at least either one of an end part between the first end part and the second end part be formed to be reduced in a diameter toward an end surface of the end part, and a convex part having a second tapered surface which abuts to the outer-inclined surface be formed on at least one of the fixed die and the movable die, and the second tapered surface be made to abut the outer-tapered surface in the die-clamping step. In this case, the sintered part is preferably a sintered bearing.

In the above aspects, since the outer inclined surface provided on the outer peripheral surface of the sintered part is covered by the first tapered surface or the inner inclined surface provided on the penetrated hole of the sintered part is covered by the second tapered surface, it can be reliably prevented that at least either one end part of the first end part and the second end part is covered with the material of the exterior part in a filmy state. Moreover, when the sintered part is a sintered bearing, it is possible to prevent the penetrated hole (a bearing hole) from being filmy covered with the material of the exterior part.

As one aspect of the insert sintered part according to the present invention, it is preferable that the end part at least either one of the first end part and the second end part of the sintered part protrude from the exterior part, and an outer-inclined surface be formed on an outer peripheral surface of the one end part of the sintered part to be reduced in a diameter and an outer-inclined surface toward the end surface of the one end part. In this case, the sintered part is preferably a sintered bearing having one penetrated hole which penetrates the first end part and the second end part.

As another aspect of the insert sintered part, it is preferable that the sintered part have one penetrated hole which penetrates the first end part and the second end part, and an inner inclined surface be provided in the penetrated hole to be increased in a diameter toward at least either one end surface of an end part between the first end part and the second end part. In this case, the sintered part is preferably be a sintered bearing.

As one aspect of the insert sintered part, it is preferable that a groove or a protrusion bar be formed on an outer peripheral part of the sintered part.

As another aspect of the insert sintered part, it is preferable that a large-diameter part having a larger diameter than that of the one end part be formed on the outer peripheral part of the sintered part and at least either of a groove or a protrusion bar along an axial direction on an outer peripheral surface of the large-diameter part and the groove or the protrusion bar along a radial direction on an end surface of the large-diameter part be formed.

Advantageous Effects of Invention

The present invention can appropriately integrate a sintered part and an exterior part such as a resin part by insert-molding even in a case in which a height of a sintered part such as a sintered bearing is irregular.

DETAILED DESCRIPTION OF THE INVENTION

Embodiments of the present invention will be explained below. In the following embodiments, a resin part (exterior part) is integrated by an injection molding (insert molding) with a sintered bearing (sintered part).

[First Embodiment] First, an insert bearing (insert sintered part) 1 of a first embodiment will be explained. In this embodiment, an example in which a large-diameter part 13 with a larger outer diameter than one end part of a sintered bearing 10 is formed in a part on an outer peripheral part except for one end part of the sintered bearing 10 (sintered part) used for the insert bearing 1 except one end part is explained.

Figure 1:
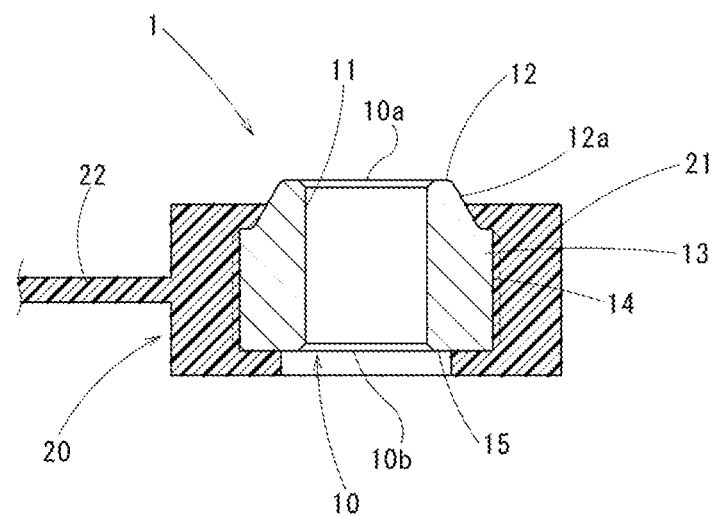
FIG. 1 is a vertical cross-sectional view showing an insert bearing of a first embodiment of the present invention.

The insert bearing 1 has the cylindrical sintered bearing 10 made of a sintered body of metal powder and a resin part 20 (corresponsive to an exterior part of the present invention) formed integrally with the outer peripheral part of the sintered bearing 10, as shown in FIG. 1.

Figure 2:
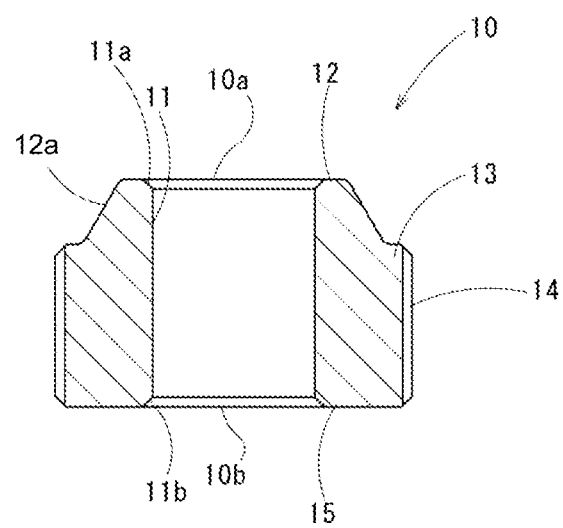
FIG. 2 is a vertical cross-sectional view of a sintered bearing used in the insert bearing in FIG. 1.
Figure 3:
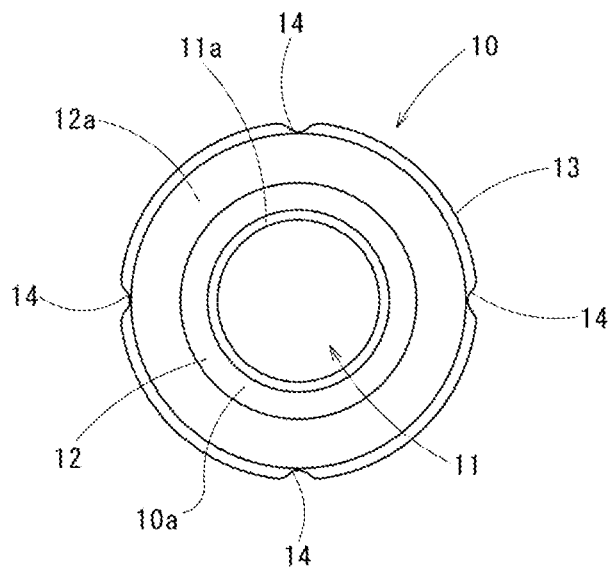
FIG. 3 is an end-surface view of the sintered bearing in FIG. 2, seen in an axial direction from a first end part side.

The sintered bearing 10 has a bearing hole (penetrated hole) 11 which penetrates a center, a first end part 12 which is positioned at an upper end part side of the bearing hole 11, and a second end part 15 which is positioned at a lower end part side of the bearing hole 11, as shown in FIG. 2 and FIG. 3. That is, the bearing hole 11 is one penetrated hole which penetrates the first end part 12 and the second end part 15.

The sintered bearing 10 has the large-diameter part 13 which is larger than the first end part 12 in the outer diameter and extends from a middle part to the second end part 15 in an axial direction. An end surface (a second end surface 10*b*) of the sintered bearing 10 at the second end part 15 side is formed in a flat-surface shape without steps.

The first end part 12 is formed on the sintered bearing 10 in a tapered shape gradually expanded in diameter from the end surface (the first end surface 10*a*) at the first end part 12 side toward the large-diameter part 13. The tapered surface (outer-inclined surface 12*a*) is formed to have a slope of 15° (taper angle 30°) for example, and a part thereof is protruded from the resin part 20.

Both end parts of the bearing hole 11 are chamfered, and tapered surfaces 11*a* and 11*b* are formed so that the outer diameter is gradually enlarged respectively toward the first end surface 10*a* and the second end surface 10*b*. The tapered surfaces 11*a* and 11*b* correspond to an inner-inclined surface of the present invention, and are formed in an aforementioned forming step or a correction step, or by mechanical machining (cutting) or the like after the correction step.

On an outer peripheral surface of the large-diameter part 13, a plurality (four) of grooves 14 along the axial direction are formed over whole length of the large-diameter part 13, i.e., from the first end surface 10*a* to the second end surface 10*b*. Both ends of the large-diameter part 13 are chamfered respectively. The four grooves 14 are formed at intervals of 90°, as shown in FIG. 3. These grooves 14 are formed to have a shape in which a deepest part is formed in a concave circular-arc surface, and both sides of it are connected by a convex circular-arc surface to the outer peripheral surface of the large-diameter part 13.

Although an example of only the grooves 14 are formed is shown in the present embodiment, protrusion bars projecting in a radial direction may be formed on the large-diameter part 13 along the axial direction for example.

In the sintered bearing 10, as shown in FIG. 1, the outer peripheral part except a tip end part (the vicinity of the first end surface 10*a*) of the first end part 12 is implanted in the resin part 20. That is, the resin part 20 is provided on the outer peripheral part of the sintered bearing 10 to expose the tip end of the first end part 12 and cover the base end (root part) of the first end part 12 and the large-diameter part 13.

That is, a bearing-holding part 21 of the resin part 20 is fixed integrally on the outer peripheral part of the sintered bearing 10. The bearing-holding part 21 is formed to have substantially a same height as a whole height of the sintered bearing 10, and the sintered bearing 10 is implanted there from the middle position of the first end part 12 over a whole of the large-diameter part 13. Accordingly, both end surfaces of the large-diameter part 13 are covered with the bearing-holding part 21. The resin part 20 also has a bracket 22 which is formed integrally with the bearing-holding part 20 and connected to the other parts.

A method of manufacturing the insert bearing 1 formed as above (a method of manufacturing an insert sintered part) will be explained.

Figure 4:
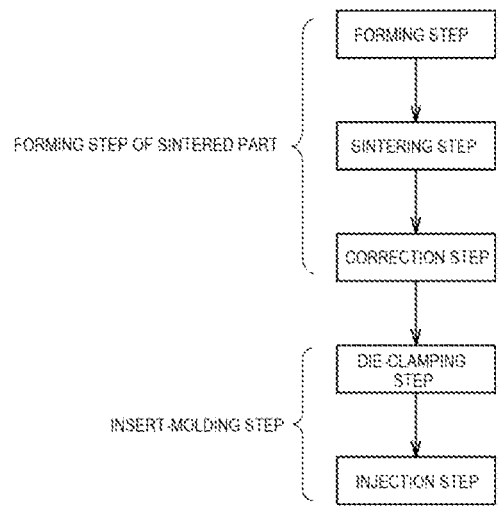
FIG. 4 is a flowchart showing a manufacturing process of the insert bearing of the first embodiment.

When the insert bearing 1 is manufactured, as shown in a flowchart of FIG. 4, a forming step of a sintered part forming the sintered bearing 10 by powder molding, and an insert-molding step disposing the sintered bearing formed by the forming step of the sintered part in an injection-molding die 60 (corresponding to a forming die of the present invention) to form the resin part 20 integrally with the outer peripheral part of the sintered bearing 10 by injection-molding are carried out. It will be described in order of steps below.

<Forming Step of Sintered Part>

The forming step of sintered part has a forming step to form a formed body 10P to be the sintered bearing 10, a sintering step to form a sintered body (not illustrated) by sintering the formed body 10P, and a correction step (sizing step) to size the sintered body.

(Forming Step)

Figure 5:
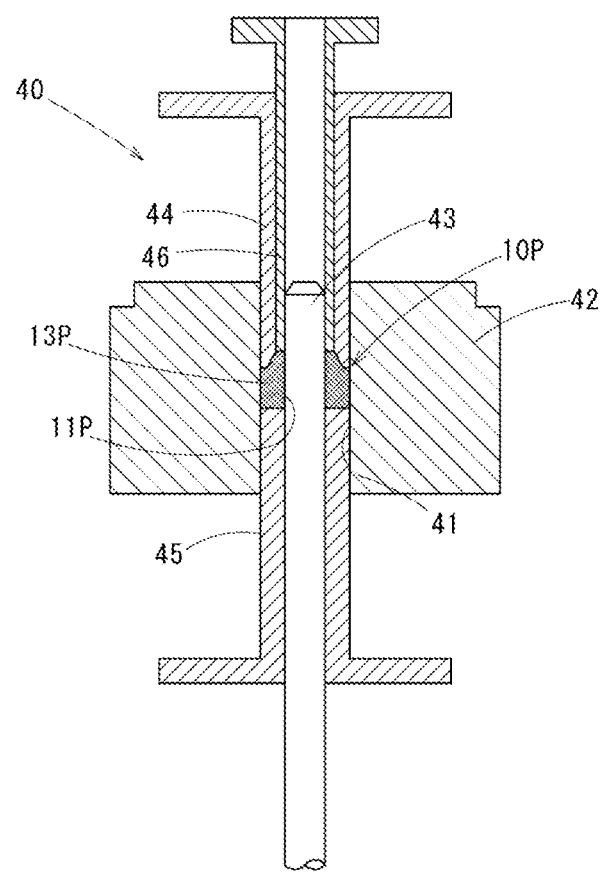
FIG. 5 is a vertical cross-sectional view showing a state of forming a formed body in a forming step.

A forming die to form the formed body 10P is provided with a die 42 in which a circular penetrated hole 41 is formed, a core rod 43 disposed in the penetrated hole 41, an outer first upper punch 44 and an inner second upper punch 46 which are disposed between the penetrated hole 41 and the core rod 43, and a first lower punch 45 facing to the first upper punch 44 and the second upper punch 46, as shown in FIG. 5. These punches 44 to 46 are formed in concentric cylindrical shape around the core rod 43 as a center.

A space made by the die 42, the core rod 43, and the first lower punch 45 is filled with powder, and compressed by the upper and lower punches 44 to 46, so that the formed body 10P is made. At this time, a tip end of the first upper punch 44 has a shape having an inclined surface as shown in FIG. 5, and a distance between the first lower punch 45 and the second upper punch 46 is larger than a distance between the first lower punch 45 and the first upper punch 44, so that the formed body 10P having a large-diameter part 13P on an outer peripheral part is formed. A penetrated hole 11P is formed into a penetrated state by the core rod 43.

(Sintering Step)

A sintered body is formed by heating the formed body 10P to sinter the powder.

(Correction Step)

The sintered body is corrected (sizing) by a correction die 80. In this correction step, the grooves 14 are formed on the outer peripheral part of the large-diameter part 13 with finishing the external form into a final dimension.

Figure 6:
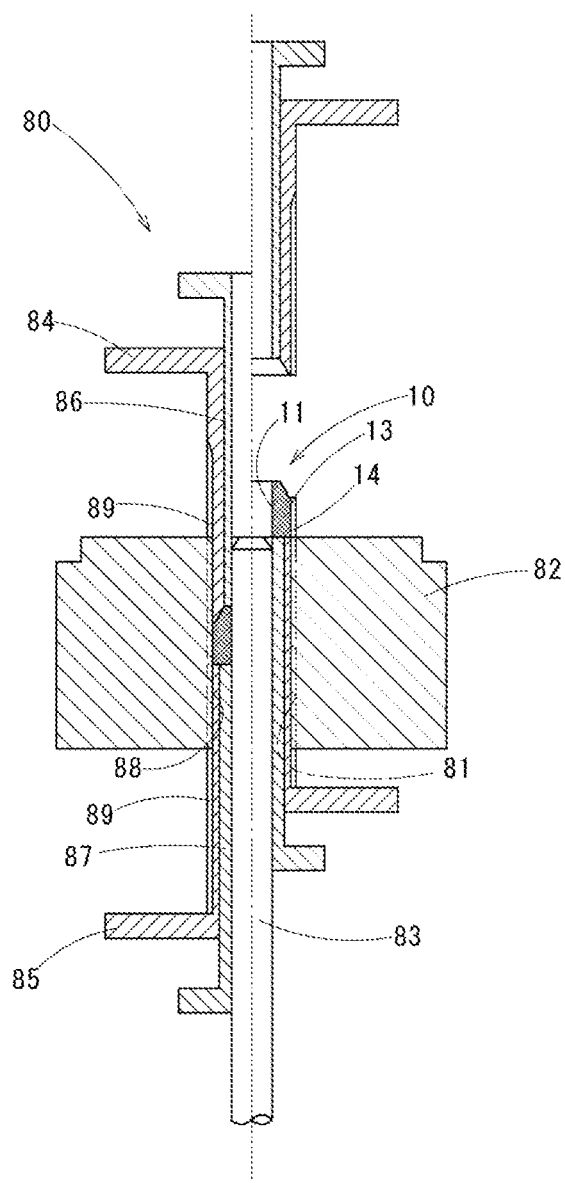
FIG. 6 is a vertical cross-sectional view showing a correction step where a left half is a state of correcting a sintered body and a right half is a state in which the sintered body is taken off from a correction die.

As shown in FIG. 6, the correction die 80 is provided with a die 82 in which a circular penetrated hole 81 is formed, a core rod 83 which is disposed in the penetrated hole 81, an outer first upper punch 84 and a first lower punch 85 and an inner second upper punch 86 and a second lower punch 87 which are disposed between the penetrated hole 81 and the core rod 83 so that they make pairs of the upper one and the lower one respectively.

On an inner peripheral surface of the penetrated hole 81 of the die 82, a plurality of protrusion bars 88 penetrating along the axial direction are formed with being spaced each other in a circumference direction. Corresponding to these protrusion bars 88, grooves 89 in which the protrusion bars 88 are slidably fitted are formed with being spaced each other in the circumference direction on an outer peripheral part of the first upper punch 84 and the first lower punch 85.

The sintered body is corrected by pushing the sintered body into the space between the die 82 and the core rod 83 with pressurizing in the axial direction by the first punches 84 and 85 and the second punches 86 and 87. By arranging the sintered body in the correction die 80 to correct, the grooves 14 along the axial direction are formed on the outer peripheral part of the large-diameter part 13 to correspond to the protrusion bars 88 of the die 82 with being spaced in the circumferential direction.

The tapered surfaces 11a and 11b of the bearing hole 11 are formed by machining (cutting) and the like after the correction step.

In addition, although the grooves 14 are formed after the correction step in the forming step of the sintered part in the present embodiment, it is not limited to this, the grooves 14 may be formed in the forming step. Moreover, the tapered surfaces 11a and 11b of the bearing hole 11 may also be formed in the forming step or the correction step.

Furthermore, the outer-inclined surface 12a may also be formed in any of the forming step, the correction step, or the machining after the correction step.

<Insert-Molding Step>

The sintered bearing 10 formed as above is integrated with the resin part 20 in the insert-molding step. The insert-molding step has a die-clamping step (corresponding to the die-clamping step of the present invention) in which the sintered bearing 10 is disposed in the injection-molding die 60 in a state in which a cavity 61 is formed outside the sintered bearing 10, and an injection step injecting melted resin (corresponding to the melted material of the present invention) to be the resin part 20 into the cavity 61.

(Die-Clamping Step)

Figure 7:
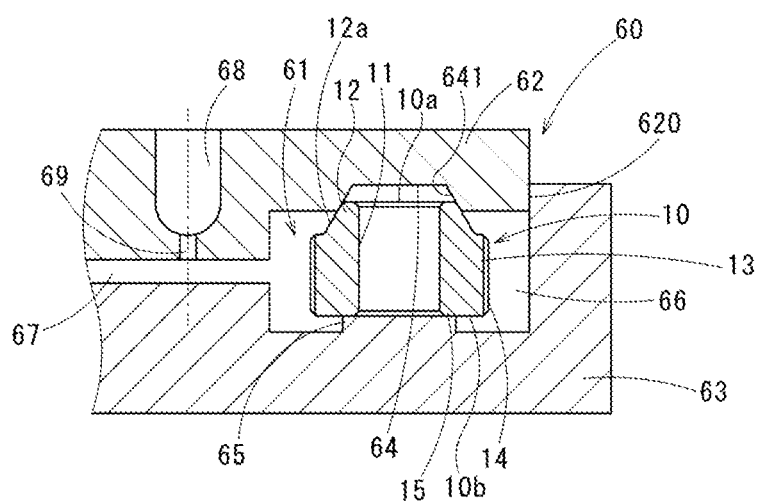
FIG. 7 is a vertical cross-sectional view showing a state of a die-clamping step in an insert-molding step.

The injection-molding die 60 has a fixed die 62 and a movable die 63 as shown in FIG. 7; the sintered bearing 10 is held between the fixed die 62 and the movable die 63 and the cavity 61 is formed, by closing (clamping) the fixed die 62 and the movable die 63. A parting surface 620 between the fixed die 62 and the movable die 63 is formed along a direction of movement of the movable die 63 (a vertical direction in FIG. 7). The sintered bearing 10 is held between the fixed die 62 and the movable die 63, and the cavity 61 which is filled with the melted resin is formed on the outer peripheral part of that sintered bearing 10.

In the fixed die 62, a concave part 64 having a first tapered surface 641 which abuts on the outer-inclined surface 12a of the sintered bearing 10 is formed.

The movable die 63 moves along the parting surface 620 so that the sintered bearing 10 is pushed against the fixed die 62 by the movable die 63. Accordingly, even if the height of the sintered bearing 10 is irregular, the first end part 12 is held in the concave part 64 of the fixed die 62 in a fit-insert state up to a middle position in a length direction. Thereby the inner peripheral surface of the concave part 64 including the first tapered surface 641 abuts on the outer-inclined surface 12a of the sintered bearing 10 at a whole circumference.

On the second end surface 10b (an end surface at the second end part 15), an end surface of a protrusion part 65 protruding from the inner surface of the movable die 63 abuts. The cavity 61 is provided with a bearing-holding space 66 formed surrounding the outer circumference of the sintered bearing 10 and a connection part 67 connected to the bearing-holding space 66. The sintered bearing 10 is held in the bearing-holding space 66 with exposing the outer peripheral surface and the end surface of the large-diameter part 13, and the base end part (the vicinity of the large-diameter part 13) of the first end part 12. To the cavity 61, a plunger (not illustrated) to which a sprue 68 in which the melted resin is supplied is connected via a gate 69 is connected to inject the melted resin to the sprue 68.

(Injection Step)

The melted resin is injected into the cavity 61 of the injection-molding die 60 which is clamped. At this time, a tip end of the first end part 12 of the sintered bearing 10 is fit-inserted in the concave part 64 of the fixed die 62; and the second end surface 10b abuts on the protrusion part 65. Although the injection pressure is applied in the cavity 61, the tip end of the first end part 12 is not exposed in the cavity 61; accordingly, the injection pressure is applied on the outer surface except the tip end of the first end part 12 of the sintered bearing 10. Accordingly, the melted resin does not leak out to the first end surface 10a of the sintered bearing 10.

If the injection pressure rises and the melted resin leaks out from the parting surface 620, a parting line (not illustrated) is formed on the outer peripheral surface of the exterior part 20; however, since the parting surface 620 of the die 60 is formed along the movement direction of the movable die 63 as shown in FIG. 7, the parting line of the resin part 20 is formed on the crossing ridge line between the outer peripheral surface and the end surface, so that it does hardly not concern the appearance of the resin part 20.

Since the movable die 63 moves along the parting surface 620, even if the height of the sintered bearing 10 is irregular, the fixed die 62 and the movable die 63 can abut on the sintered bearing 10. Thereby it is prevented that the abutted part of the fixed die 62 and the movable die 63 is filmy covered with the melted material and burrs are generated on the parting line.

In the insert bearing 1 formed as above, as shown in FIG. 1, the center part of the sintered bearing 10 except the tip end of the first end part 12 and including the large-diameter part 13 is surrounded by the resin part 20: the rotation between the sintered bearing 10 and the resin part 20 is stopped by the grooves 14, and the resin part 20 covers both ends of the large-diameter part 13 so that they are integrated not to be dropped off in the axial direction. Moreover, it is different from the sintered bearing described in the prior art: since resin films are not formed on both end surface and the parting line is formed on the ridge line, the appearance is not deteriorated and it is also restrained to interfere with the other parts.

Second Embodiment

Figure 8:
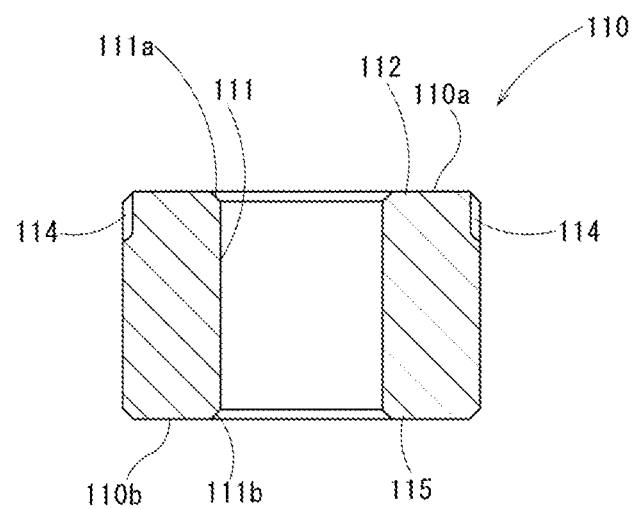
FIG. 8 is a vertical cross-sectional view of a sintered bearing according to a second embodiment of the present invention.
Figure 9:
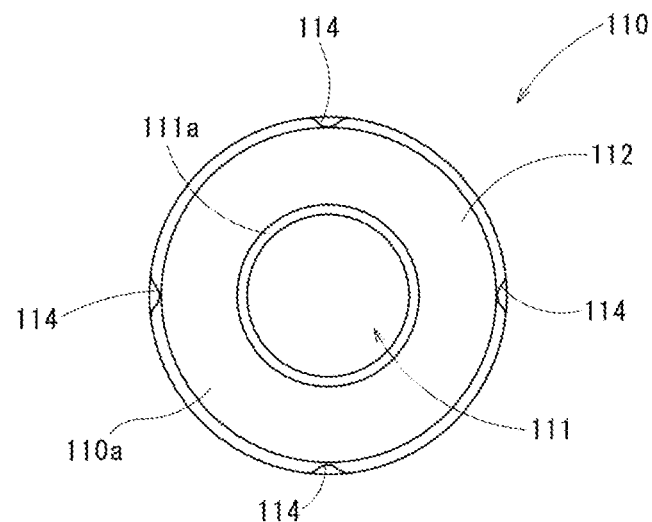
FIG. 9 is an end-surface view of the sintered bearing in FIG. 9, seen in an axial direction from a first end part side.
Figure 10:
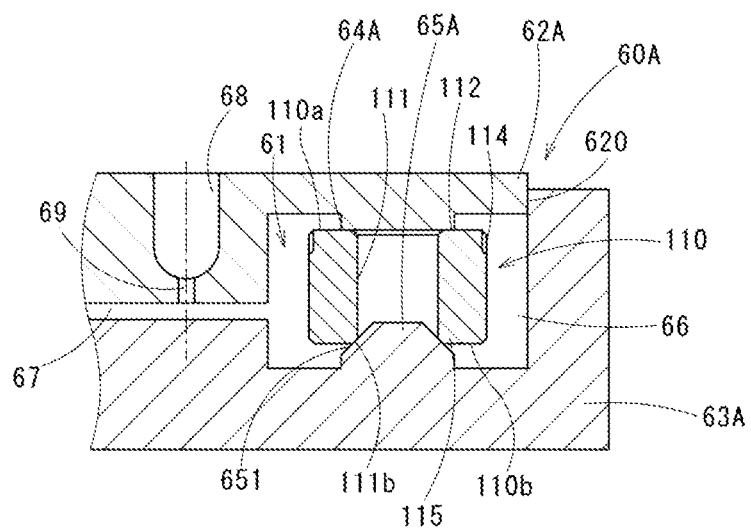
FIG. 10 is a vertical cross-sectional view showing a state of a die-clamping step of the sintered bearing of FIG. 8.

FIG. 8 and FIG. 9 are views showing a sintered bearing 110 used for an insert bearing of a second embodiment. FIG. 10 is a view showing a state of a die-clamping step in a manufacturing process of the insert bearing of the second embodiment. The sintered bearing 110 of this present embodiment is formed to a cylindrical shape which does not have the large-diameter 13 provided at the sintered bearing 10 of the first embodiment. In addition, in embodiments after this second embodiment, common elements to the first embodiment are denoted by the same symbols and the description is simplified.

As shown in FIG. 8 and FIG. 9, the sintered bearing 110 has a bearing hole (penetrated hole) 111 which penetrates the center, a first end part 112 positioned at the upper end part side of the bearing hole 111, and a second end part 115 positioned at the lower end part side of the bearing hole 111. Both end parts of the bearing hole 111 are chamfered; and tapered surfaces 111a and 111b are formed so that the outer diameter is gradually enlarged respectively toward an end surface 110a of the first end part 112 and an end surface 110b of the second end part 115. The tapered surfaces 111a and 111b correspond to the inner-inclined surface of the present invention, and are formed in the forming step or the correction step, or by mechanical machining (cutting) or the like after the correction step.

On an outer peripheral surface of the sintered bearing 110, a plurality (four) of grooves 114 along the axial direction. Specifically, four grooves 114 which are shorter than a half of a height of the sintered bearing 110 are formed on the outer peripheral surface at the first end part 112 side. These grooves 114 are formed to have a shape in which a deepest part is formed in a concave circular-arc surface, and both sides of it are connected to the outer peripheral surface of the sintered bearing 110. These four grooves 114 are formed at intervals of 90°, as shown in FIG. 9.

A method of manufacturing the insert bearing according to the second embodiment is substantially the same as the method of manufacturing the insert bearing 1 of the above-described first embodiment; however, a part of the shape of an injection-molding die used for the die-clamping step and the insert-molding step is different. It will be explained in detail below.

An injection-molding die 60A has a fixed die 62A and a movable die 63A as shown in FIG. 10; the sintered bearing 110 is held between the fixed die 62A and the movable die 63A by closing (clamping) the fixed die 62A and the movable die 63A, and the cavity 61 where the melted resin is filled is formed on the outer peripheral part of the sintered bearing 110.

In the sintered bearing 110, a second protrusion part 65A of the movable die 63A is fit-inserted in the bearing hole 111 at the second end part 115 side, so that a second tapered surface 651 of the second protrusion part 65 abuts to the tapered surface 111b of the bearing hole 111 at a whole circumference. An end surface of a first protrusion part 64A protruding from an inner surface of the fixed die 62A abuts to the first end surface 110a.

The cavity 61 is provided with a bearing-holding space 66 formed surrounding the outer circumference of the sintered bearing 110 and a connection part 67 connected to the bearing-holding space 66. The sintered bearing 110 is held in the bearing-holding space 66 with exposing the outer peripheral surface, a part of the first end surface 110a, and the second end surface 111b. To the cavity 61, a plunger (not illustrated) to which a sprue 68 in which the melted resin is supplied is connected via a gate 69 is connected to inject the melted resin to the sprue 68.

The melted resin is injected into the cavity 61 of the injection-molding die 60A which is clamped. At this time, the second protrusion part 65A of the movable die 63A is fit-inserted in the bearing hole 111 at the second end part 115 side of the sintered bearing 110; so that the tip end of the second protrusion part 65A is fit-inserted, and the first end part 112 abuts on the first protrusion part 64A. Although the injection pressure is applied in the cavity 61, the tapered surface 111b of the bearing hole 111 at the second end part 115 side abuts on the second tapered surface 651 of the second protrusion part 65A and this part is not exposed in the cavity 61, so that the injection pressure is applied on the outer surface except the tapered surface 111b of the bearing hole of the sintered bearing 110.

Accordingly, the melted resin does not leak to a part at the second end part 115 side in the bearing hole 111 of the sintered bearing 110. If the injection pressure rises and the melted resin leaks out from the parting surface 620, a parting line (not illustrated) is formed on the outer peripheral surface of the exterior part; however, since the parting surface 620 of the die 60A is formed along the movement direction of the movable die 63A as shown in FIG. 10, the parting line of the resin part is formed on the crossing ridge line between the outer peripheral surface and the end surface, so that it does hardly not concern the appearance of the resin part.

Third Embodiment

Figure 11:
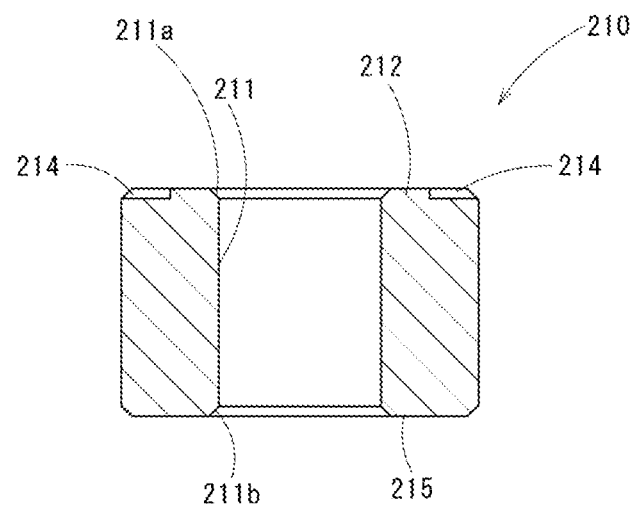
FIG. 11 is a vertical cross-sectional view of a sintered bearing used for an insert bearing according to a third embodiment of the present invention.
Figure 12:
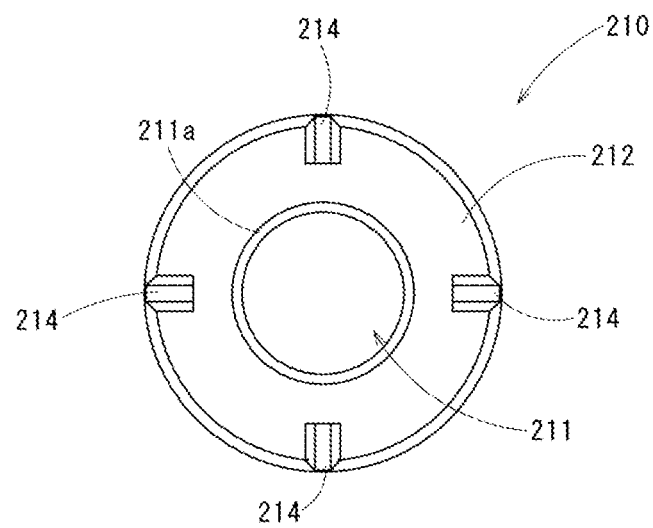
FIG. 12 is an end-surface view of the sintered bearing of FIG. 11, seen in an axial direction from a first end part side.

FIG. 11 and FIG. 12 show a sintered bearing 210 used for an insert bearing of a third embodiment.

The sintered bearing 210 of this embodiment is provided with a bearing hole (penetrated hole) 211 which penetrates the center, a first end part 212 positioned at an upper end part side of the bearing hole 211, and a second end part 215 positioned at a lower end part side of the bearing hole 211, as shown in FIG. 11 and FIG. 12, as in the second embodiment. On both end parts of the bearing hole 211, tapered surfaces (inner-inclined surfaces) 211a and 211b are formed in the forming step or the correction step, or by the mechanical machining (cutting) or the like after the correction step.

Grooves 214 formed in the sintered bearing 210 are formed four on an end surface of the first end part 212 at intervals of 90° in a shape extending in a radius direction, as shown in FIG. 11 and FIG. 12. These grooves 214 are formed to have a shape in which a deepest part is flat, and has inclined surfaces which are gradually expanded from the deepest part toward the upper side.

The sintered bearing 210 of this embodiment is different from the second embodiment only in the shape of the grooves 214, so the insert bearing is formed by using the same injection-molding die 60A as in the second embodiment. Accordingly, also in the present embodiment, the same effect as in the second embodiment can be obtained.

Fourth Embodiment

Figure 13:
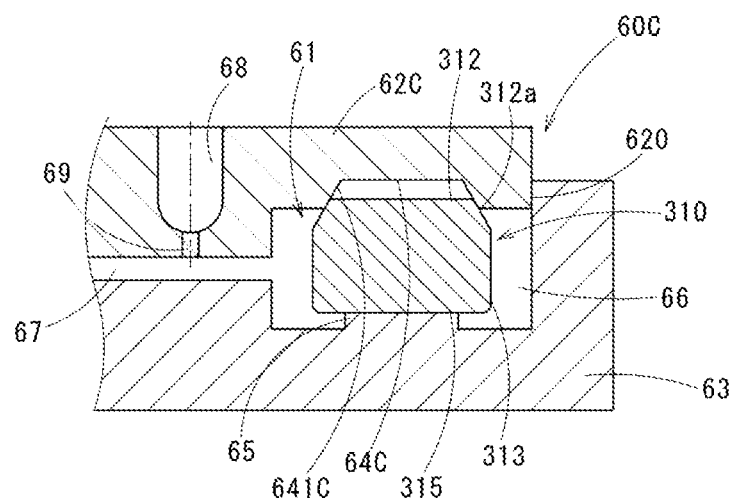
FIG. 13 is a vertical cross-sectional view showing a state of a die-clamping step of a sintered bearing used for an insert bearing according to a fourth embodiment of the present invention.

FIG. 13 is a view showing a state of die-clamping step in a method of manufacturing an insert bearing of a fourth embodiment.

A sintered bearing 310 of the fourth embodiment differs from the first to third embodiments, and is a pivot bearing formed in a solid state: as shown in FIG. 13, a first end part 312, a second end part 315, and a large-diameter part 313 which is larger than the first end part 312 in an outer diameter are provided.

The first end part 312 is formed in a tapered shape in which the outer diameter is gradually reduced from the large-diameter part 313 toward the end surface. The tapered surface (the outer-inclined surface 312a) is formed to have a slope of 15° (taper angle 30°) for example.

The sintered bearing 310 is put in an injection-molding die 60C and formed into an insert bearing. The movable die 63 moves along the parting surface 620, so that the sintered bearing 310 is pressed against a fixed die 62C by the movable die 63. Accordingly, even if the height of the sintered bearing 310 is irregular, the first end part 312 is held in a concave part 64C of the fixed die 62C in a fit-insert state up to a middle position in a length direction.

Thereby the inner peripheral surface of the concave part 64C including the first tapered surface 641C abuts on the outer-inclined surface 312a of the sintered bearing 310 at a whole circumference. On an end surface of the second end part 315, the end surface of the protrusion part 65 protruding from the inner surface of the movable die 63 abuts.

The melted resin is injected into the cavity 61 of the injection-molding die 60C which is die-clamped. At this time, a tip end of the first end part 312 of the sintered bearing 310 is fit-inserted in the concave part 64C of the fixed die 62C; and the second end part 315 abuts on the protrusion part 65. Although the injection pressure is applied in the cavity 61, the tip end part of the first end part 312 is not exposed in the cavity 61; accordingly, the injection pressure is applied on the outer surface except the tip end part of the first end part 312 of the sintered bearing 310.

The parting surface 620 of the die 60C is formed along the movement direction of the movable die 63 as shown in FIG. 13, the parting line of the resin part is formed on the crossing ridge line between the outer peripheral surface and the end surface, so that it does hardly not concern the appearance of the resin part.

Accordingly, even if the sintered bearing 310 does not have a bearing hole, similar effects as in the above-described embodiments can be obtained.

In addition, the present invention is not limited to the structures of the above-described embodiments and various modifications may be made in detailed structures without departing from the scope of the present invention.

For example, in the first embodiment, the outer-inclined surface 12a of the first end part 12 is put in the concave part 64 of the fixed die 62, and the second end part 15 abuts on the protrusion part 65 of the movable die 63 (the tapered surface of the die abuts on one tapered surface of the bearing hole and does not abut on the other tapered part); it is not limited to this, as in the second embodiment, the structure in which the tapered surface 111b of the bearing hole 111 abuts on the second tapered surface 651 (a structure in which the tapered surface of the die abuts on both tapered surfaces of the bearing hole) may be applied. In this case, it is reliably restrained that the resin material enters in the bearing hole from both sides.

Examples in which the grooves are formed on the end surface, the outer peripheral surface, or the large-diameter part of the sintered bearing are shown in the first to fourth embodiments; protrusion bars instead of the grooves may be formed. Several grooves and protrusion bars are preferably formed with a space in a circumference direction; however, only one may be formed.

Moreover, embodiments in which the exterior parts are formed by injection-molding resin were explained; however, the present invention may be applied for a case in which an exterior part is formed by casting metal such as aluminum alloy and the like. In this case, the sintered part is disposed in a casting die (a forming die) and di-clamped (die-clamping step) and a cavity around it is filled with melted metal (melted material) which becomes the exterior part (injection step), so that the sintered bearing and the metal exterior part are integrated.

In the first to fourth embodiments, the sintered bearings were exemplified as the sintered parts and the insert bearings were exemplified as the insert sintered part; however, the sintered part is not limited to a bearing but may be a bulb sheet, a bush, and the like. That is, the present invention can be applied for sintered parts not only for sintered bearings; it can be applied for all products in which the sintered part is integrated with the exterior part.

Figure 14:
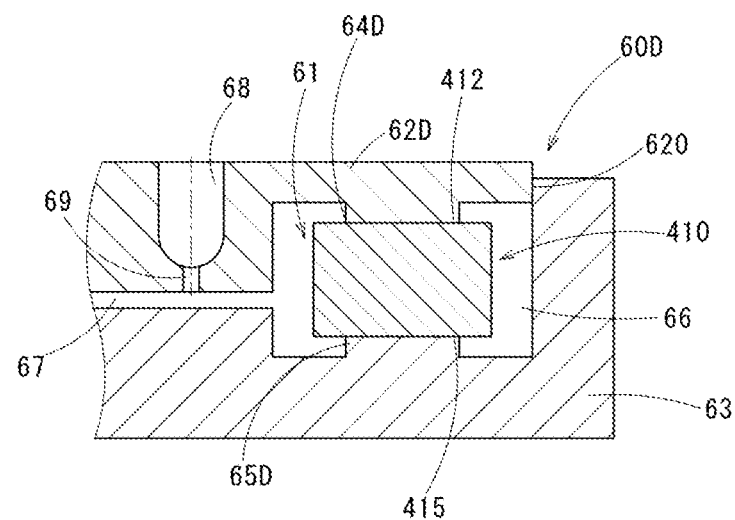
FIG. 14 is a vertical cross-sectional view showing a state of a die-clamping step of a sintered part used for an insert sintered part according to a modification of the present invention.

For example, the sintered part may be a sintered part 410 having a rectangular-plate shape as shown in FIG. 14. In this case, in an injection-molding die 60D, it is enough that a first end part 412 of the sintered part 410 abuts on a first protrusion part 64D of a fixed die 62D, and a second end part 415 abuts on a second protrusion part 65D of the movable die 63. That is, even if the outer-inclined surface and the inner-inclined surface are not formed in the sintered part, it is a scope of rights of the present invention.

INDUSTRIAL APPLICABILITY

Even if a height of a sintered part such as a sintered bearing is irregular, a sintered part and an exterior part such as a resin part can be appropriately integrated by insert-molding.

REFERENCE SIGNS LIST

1 Insert bearing (Insert sintered part)
10, 110, 210, 310 Sintered bearing (Sintered part)
410 Sintered part
10P Formed body
11, 111, 211 Bearing hole (Penetrated hole)
11a, 11b, 111a, 111b, 211a, 211b Tapered surface (Inner-inclined surface)
12, 112, 212, 312 First end part
15, 115, 215, 315, 415 Second end part
12a, 312a Outer-inclined surface
13, 313 Large-diameter part
14, 114, 214 Groove
20 Resin part (Exterior part)
21 Bearing-holding part
40 Forming die
80 Correction die
60, 60A, 60C, 60D Injection-molding die (Forming die)
61 Cavity
62, 62A, 62C Fixed die
63, 63A Movable die
64, 64C Concave part
641, 641C First tapered surface
64A, 64D First protrusion part
65 Protrusion part
65A, 65D Second protrusion part
651 Second tapered surface
66 Bearing-holding space
67 Connection part
68 Sprue
69 Gate

The invention claimed is:

1. A method of manufacturing an insert sintered part comprising:
   a sintered part-forming step of forming a sintered part having a first end part and a second end part by powder molding; and
   an insert-molding step of forming an insert sintered part in which an exterior part is integrated into an outer peripheral part of the sintered part, wherein
   a forming die used in the insert-molding step includes a fixed die and a movable die, wherein there is a parting surface along which the fixed die and the movable die abut each other, the insert-molding step has:
- a die-clamping step in which the sintered part is held between the fixed die and the movable die, the movable die is moved along the parting surface, and the sintered part is pressed against the fixed die by the movable die to form a cavity around the sintered part such that said forming die covers a region of the sintered part with a gap except for a portion where the first end part abuts the fixed die and a portion where the second part abuts the movable die; and
- a filling step of filling the cavity with a melted material being formed into the exterior part after the die-clamping step, and the parting surface is formed along a movement direction of the movable die in the die-clamping step.

2. The method of manufacturing an insert sintered part according to claim 1, wherein
- in the sintered part-forming step, an outer-inclined surface on an outer peripheral surface of at least either one of an end part between the first end part and the second end part is formed to be reduced in a diameter toward an end surface of the end part, and
- a concave part having a first tapered surface which abuts the outer-inclined surface is formed on at least one of the fixed die and the movable die, and the first tapered surface is made to abut the outer-tapered surface in the die-clamping step.

3. The method of manufacturing the insert sintered part according to claim 2, wherein the sintered part is a sintered bearing having one penetrating hole which penetrates the first end part and the second end part.

4. The method of manufacturing an insert sintered part according to claim 1, wherein
- in the sintered part-forming step, one penetrated hole which penetrates the first end part and the second end part is formed and an inner-inclined surface is formed in the penetrated hole to be increased in a diameter toward at least either one end surface of one end part between the first end part and the second end part,
- a protruded part having a second tapered surface which abuts the inner-inclined surface is formed on at least one of the fixed die and the movable die, and
- in the die-clamping step, the second tapered surface is made to abut the inner inclined surface.

5. The method of manufacturing the insert sintered part according to claim 4, wherein the sintered part is a sintered bearing.

6. The method of manufacturing the insert sintered part according to claim 1, wherein
- the sintered part is a sintered bearing having one penetrating hole which penetrates the first end part and the second end part.

* * * * *